United States Patent
Kunkee et al.

(10) Patent No.: US 6,608,950 B2
(45) Date of Patent: Aug. 19, 2003

(54) INTEGRATED OPTOELECTRONIC DEVICE AND METHOD FOR MAKING SAME

(75) Inventors: Elizabeth T. Kunkee, Manhattan Beach, CA (US); David V. Forbes, Oregon, WI (US); James E. Leight, San Ramon, CA (US); Mahmoud Fallahi, Tucson, AZ (US)

(73) Assignee: Northrop Grumman Corporation, Los Angeles, CA (US)

( * ) Notice: Subject to any disclaimer, the term of this patent is extended or adjusted under 35 U.S.C. 154(b) by 1 day.

(21) Appl. No.: 09/783,692

(22) Filed: Feb. 14, 2001

(65) Prior Publication Data

US 2002/0110308 A1 Aug. 15, 2002

(51) Int. Cl.[7] ................................................. G02B 6/42
(52) U.S. Cl. ........................................ 385/39; 385/130
(58) Field of Search ............................ 385/39, 129–132

(56) References Cited

U.S. PATENT DOCUMENTS

| | | | | |
|---|---|---|---|---|
| 4,904,036 A | * | 2/1990 | Blonder | 350/96.11 |
| 5,080,962 A | * | 1/1992 | Hench | 428/218 |
| 5,677,970 A | * | 10/1997 | Nashimoto | 385/7 |
| 5,854,868 A | | 12/1998 | Yoshimura et al. | 385/50 |
| 6,246,809 B1 | * | 6/2001 | Jouanno et al. | 385/22 |
| 6,309,803 B1 | * | 10/2001 | Coudray et al. | 430/321 |

FOREIGN PATENT DOCUMENTS

WO  0175495  10/2001

OTHER PUBLICATIONS

Li, C.-Yi., et al., *Sol–gel Integrated Optical Coupler By Ultraviolet Light Imprinting*, Feb. 16, 1995, Electronics Letters, IEE Stevenage, GB, vol. 31, No. 4, pp. 271–272.
Fardad, M.A., et al., *Novel Sol–gel Fabrication of Integrated Optical Waveguides*, Feb. 12, 1997, Proceedings of the SPIE, SPIE, Bellingham, VA, US, vol. 2997, pp. 72–78.

* cited by examiner

Primary Examiner—Akm Enayet Ullah
Assistant Examiner—Jerry T. Rahll

(57) ABSTRACT

An integrated optoelectronic device (1) includes a substrate (4), at least one optoelectronic component (2) provided on the substrate (4), and a waveguide (9a ... 9n) provided on the substrate (4) and optically connected to the at least one optoelectronic component (2). The waveguide (9a ... 9n) is made of a sol-gel glass. A method for making the integrated optoelectronic device (1) includes the steps of providing a substrate (4), providing at least one optoelectronic component (2) on the substrate (4), and providing at least one sol-gel glass waveguide (9a ... 9n) on the substrate (4) and optically connected to the at least one optoelectronic component (2).

14 Claims, 5 Drawing Sheets

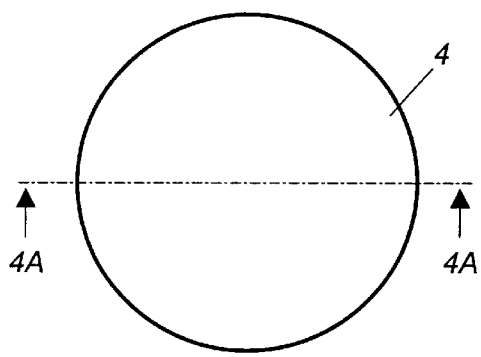 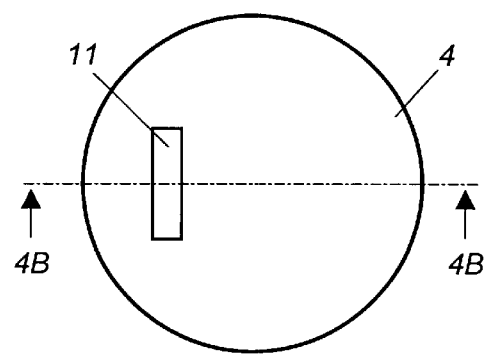
Figure 3AFigure 3B
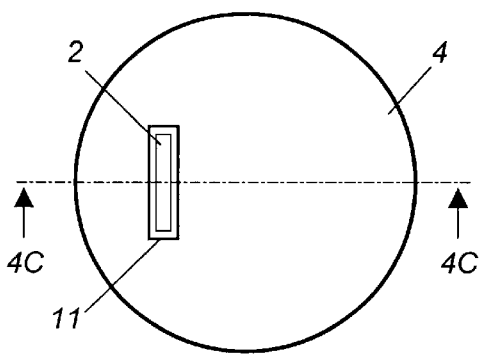 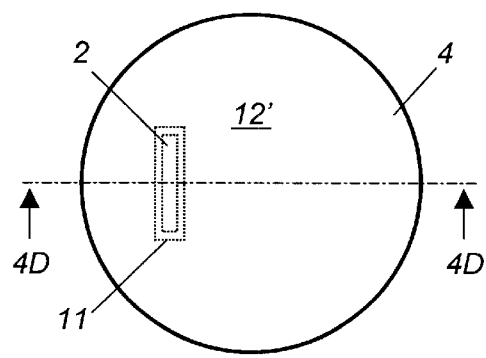
Figure 3CFigure 3D

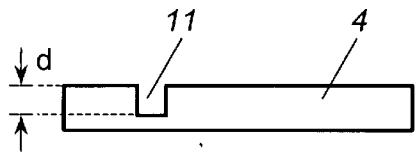
Figure 4A  Figure 4B
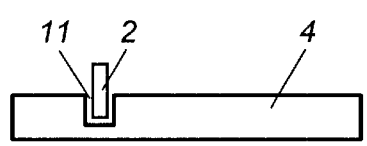
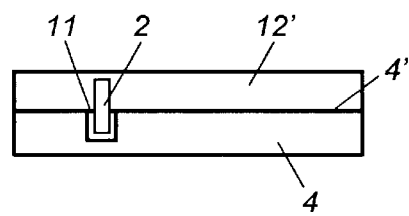
Figure 4C  Figure 4D
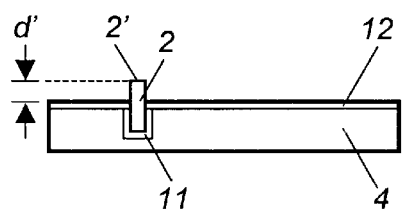
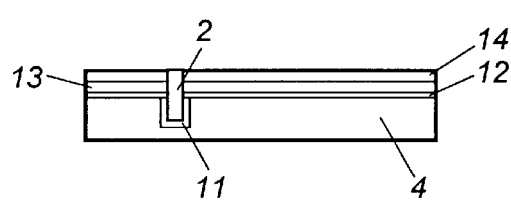
Figure 4E  Figure 4F

INTEGRATED OPTOELECTRONIC DEVICE AND METHOD FOR MAKING SAME

BACKGROUND OF THE INVENTION

The present invention relates to an integrated optoelectronic device and a method for making an integrated optoelectronic device. Such a device includes electronic and optoelectronic components integrated with, e.g., glass or glass-like optic components.

Sophisticated and complex photonic signal processing architectures require physical properties and operational characteristics that are not present in one single material system. For this reason, there is great interest in methods to combine semiconductor optoelectronic devices with glass or glass-like integrated optic components.

A wide variety of applications for military and commercial systems and components exists that requires increasing levels of integration of optoelectronic devices. Integration of a variety of devices into a compact and multifunctional structure enables increased capability for sophisticated signal processing in a manner that is compact and results in minimal requirements for component mass and DC power. These considerations are critical cost drivers for many sensor and communication applications where compact integration facilitates things such as personal communication handset miniaturization or space deployment of network assets.

Heterogeneous integration is most typically accomplished using silica-on-silicon waveguides. The semiconductor chips are usually aligned in a flip chip configuration and bump-bonded to the silica-on-silicon waveguides.

However, with heterogeneous integration of semiconductor devices with silica-on-silicon, high processing temperatures dictate that the passive-optical waveguides (i.e., silica-on-silicon) be made first, followed by alignment and bonding of the semiconductor chip.

SUMMARY OF THE INVENTION

The present invention relates to an integrated optoelectronic device and a method for making an integrated optoelectronic device. The optoelectronic device includes a substrate, at least one optoelectronic component provided on the substrate, and a waveguide provided on the substrate and optically connected to the at least one optoelectronic device. According to the present invention, the waveguide is made of a sol-gel glass.

The method for making an integrated optoelectronic device includes the steps of providing a substrate, providing at least one optoelectronic component on the substrate, and providing at least one waveguide on the substrate and optically connected to the at least one optoelectronic device. According to the present invention, the waveguide is made of a sol-gel glass.

According to certain embodiments of the present invention, the optoelectronic component can be a semiconductor chip, e.g., made of a III–V semiconductor material. The semiconductor chip can be mounted top side up on the substrate. At least one optoelectronic component can be an array of semiconductor waveguide devices.

According to certain embodiments of the method for making the integrated optoelectronic device of the present invention, the step of providing at least one optoelectronic component on the substrate includes etching a recess in the substrate, the recess having a depth less than the thickness of at least one optoelectronic component, and affixing the optoelectronic component in the recess so that an upper surface of the optoelectronic component extends above an upper surface of the substrate.

The method can further include the steps of forming a vertical alignment layer over the substrate, and providing the vertical alignment layer with a thickness sufficient to allow the upper surface of the at least one optoelectronic component to extend above an upper surface of the vertical alignment layer. This can be accomplished by flattening the upper surface of the vertical alignment layer after it is formed-over the substrate, then etching the vertical alignment layer over the substrate until the upper surface of the optoelectronic component is exposed, and then performing a timed etch to provide the vertical alignment layer with the thickness sufficient to allow the upper surface of the optoelectronic component to extend above the upper surface of the vertical alignment layer.

The at least one waveguide can be provided on the substrate by coating a sol over the upper surface of the vertical alignment layer, curing the sol to provide a sol-gel glass layer, and patterning the sol-gel to provide the at least one waveguide. A sol-gel cladding layer can be provided on the vertical alignment layer before providing the at least one waveguide, and waveguide provided on the sol-gel cladding layer.

BRIEF DESCRIPTION OF THE DRAWINGS

FIGS. 3A–3G are top plan views illustrating one embodiment of a method for making an integrated optoelectronic device according to the present invention.

FIGS. 4A–4G are, respectively, sectional views along lines 4A—4A to 4G—4G of FIGS. 3A to 3G, respectively, illustrating one embodiment of a method for making an integrated optoelectronic device according to the present invention.

DETAILED DESCRIPTION OF THE PREFERRED EMBODIMENTS

Figure 1:
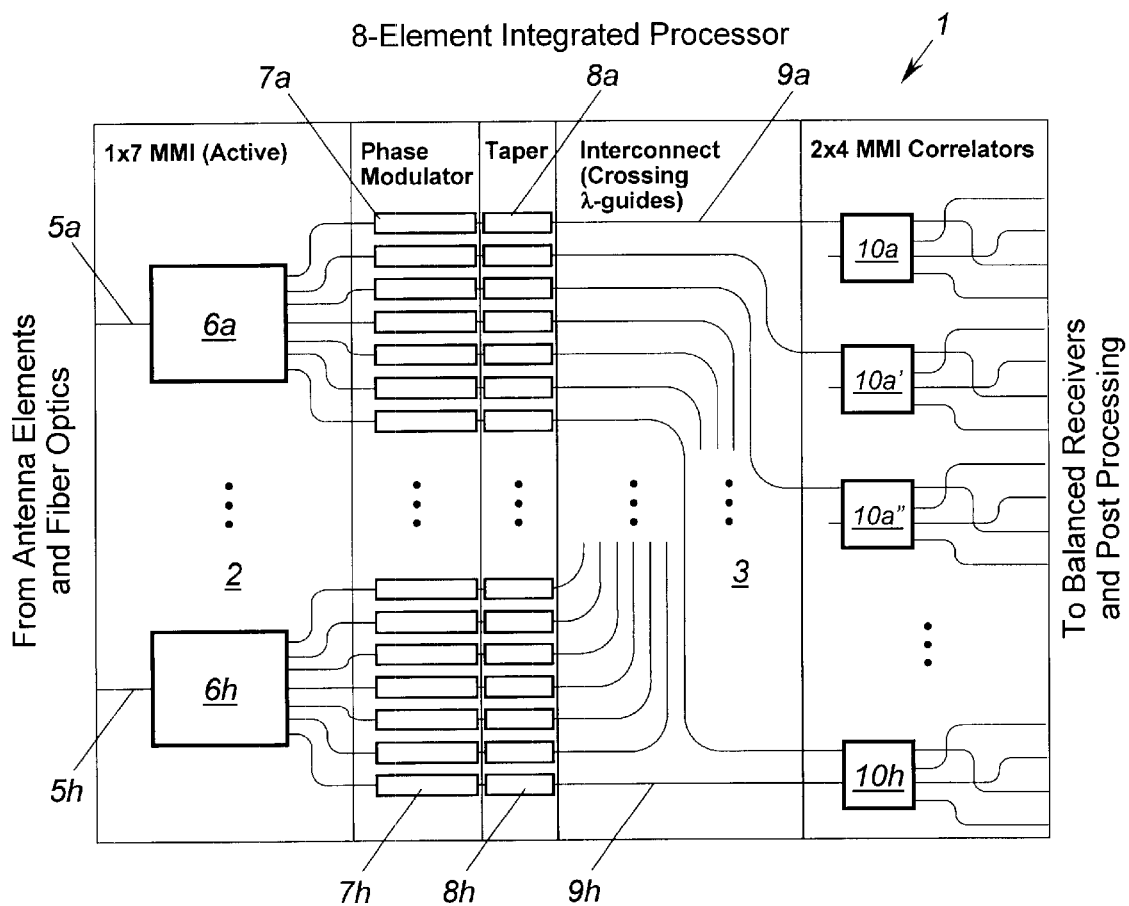
FIG. 1 is a schematic top plan view of a representative optoelectronic device which could be assembled using the present invention.
Figure 2:
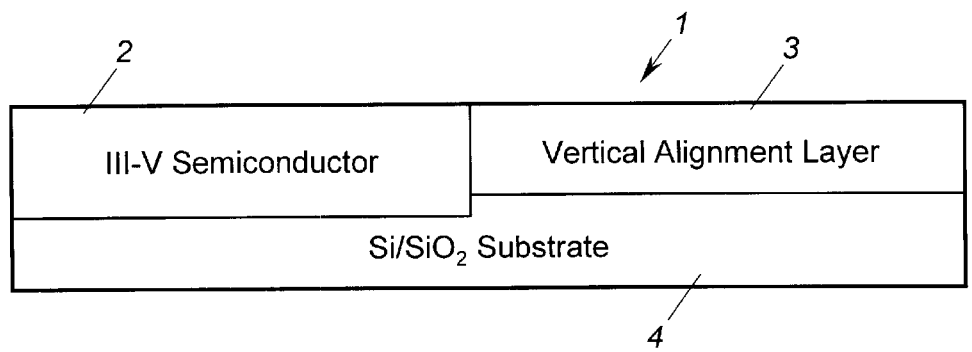
FIG. 2 is a schematic side view of the integrated optoelectronic device of the present invention.

FIGS. 1 and 2 are schematic representations of one embodiment of an integrated optoelectronic device according to the present invention. In the embodiment shown in FIGS. 1 and 2, an eight element integrated processor is shown as one example of the present invention. FIG. 1 is a schematic plan view and FIG. 2 is a schematic side view representing an integrated processor generally designated by the reference numeral 1 for an eight element system. As shown in FIG. 2, an integrated optoelectronic device 1 includes a semiconductor region 2, e.g., a III–V semiconductor region, and a sol-gel glass region 3. The semiconductor region 2 and sol-gel glass region 3 are provided on a substrate 4, in this case, a silicon-silicon dioxide substrate.

As shown more particularly in FIG. 1, the device 1 is provided with eight inputs 5a ... 5h from antenna elements and fiber optics, only two of which (5a, 5h) are shown so as to simplify FIG. 1. Each input 5a ... 5h is connected to an active device 6a ... 6h, in this case a 1×7 multimode (MMI) active device. Each semiconductor device 6a ... 6h is connected to, in this embodiment, phase modulators 7a ... 7h and tapers 8a ... 8h.

In the sol-gel processed glass 3, a plurality of waveguides 9a ... 9h (only some of which are labeled with reference numerals for the sake of clarity) are provided. Each of the waveguides 9a ... 9h are connected to one of the tapers 8a ... 8h. In the embodiment shown in FIG. 1, the waveguides can be connected to 2×4 man-machine interfaces (MMI) correlators 10a ... 10h, the outputs of which are connected to balanced receivers and post processing.

The types of devices and/or device arrays shown in the embodiment of FIGS. 1 and 2 are by way of example only. As one skilled in the art would understand, a variety of electronic, optoelectronic, photonic and optic devices can be interconnected according to the present invention, as will be evident from the preceding description and the description hereinafter.

According to the present invention, as shown in FIG. 1, the semiconductor device array 2 can be mounted on the substrate 4 top side up. The top side up mounting of the semiconductor devices 2 facilitates access to tens of electrical drive contacts.

Figure 3E:
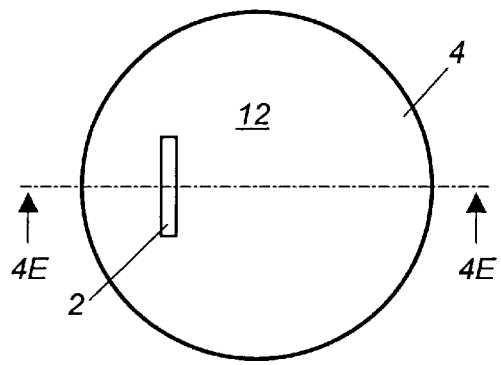
Figure 3F:
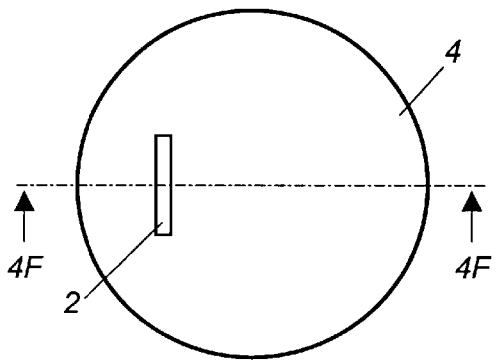
Figure 3G:
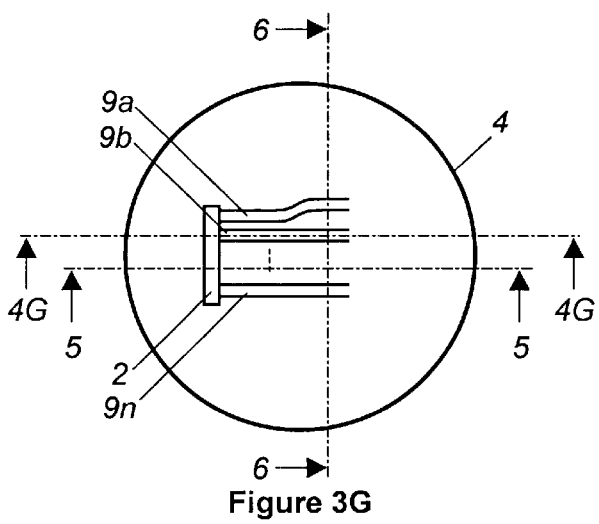
Figure 5:
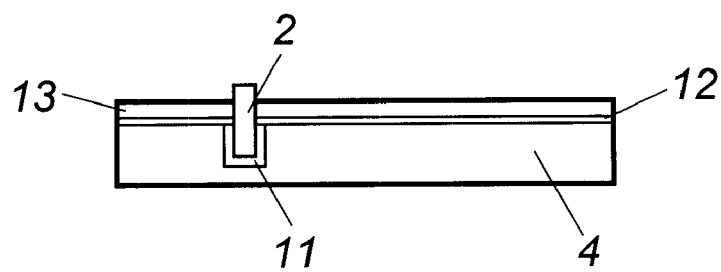
FIG. 5 is a sectional view along line 5—5 of FIG. 3G illustrating one embodiment of a method for making an integrated optoelectronic device according to the present invention.
Figure 6:
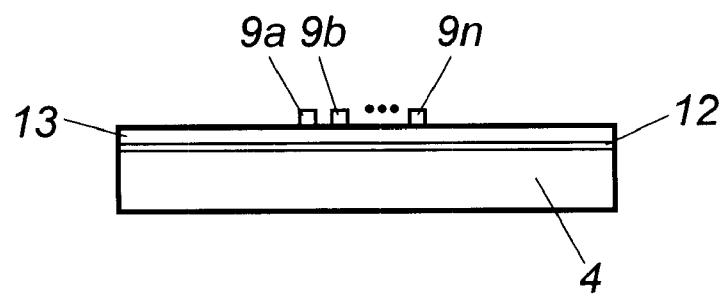
FIG. 6 is a sectional view along line 6—6 of FIG. 3G illustrating one embodiment of a method for making an integrated optoelectronic device according to the present invention.

One embodiment of a method for making an integrated optoelectronic device according to the present invention is shown in FIGS. 3A–3G which are top plan views illustrating one embodiment of the method, and in FIGS. 4A–4G, which are, respectively, sectional views along lines 4A—4A to 4G—4G of FIGS. 3A–3G, respectively. In addition, FIG. 5 is a sectional view along line 5—5 of FIG. 3G, and FIG. 6 is a sectional view along lines 6—6 of FIG. 3G.

According to the method for making an optoelectronic device of the present invention, as shown in FIGS. 3A and 4A, a substrate 4 is provided. By way of example only, the substrate 4 can be a 2 inch, 3 inch or 4 inch silicon, GaAs or InP substrate. The substrate can have, e.g., a thickness of about 12 to 16 mils.

Figure 4G:
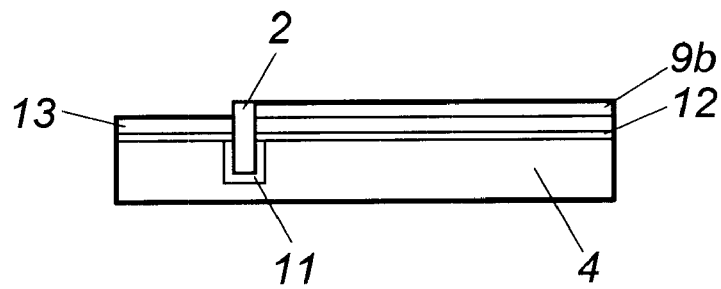

While the semiconductor region 2 could be formed directly in or on the substrate 4, in the embodiment shown in FIGS. 3A–3G, 4A–4G, 5 and 6, the semiconductor optoelectronic component(s) 2 is provided in a recess 11 which is formed, e.g., by etching, in the substrate 4 as shown in FIGS. 3B and 4B. The recess 11 has a depth less than the thickness of the optoelectronic component 2 so that an upper surface 2' of the optoelectronic component will extend above an upper surface 4' of the substrate 4, as will be apparent hereinafter. For example, the depth d of the recess 11, as shown in FIG. 4B, can be equal to the thickness of the optoelectronic component minus about 20 µm.

The optoelectronic component 2 is then mounted, preferably top side up, in the recess 11, as shown in FIGS. 3C and 4C. If the devices in the optoelectronic component 2 are in an n-type conducting substrate, a conductive epoxy, e.g., silver epoxy, can be used to adhere the optoelectronic component 2 in the recess 11. Otherwise, any appropriate glue or adhesive can be used to adhere the optoelectronic component 2 and the recess 11.

As shown in FIGS. 3D and 4D, a vertical alignment precursor layer 12' is provided over the surface of the substrate 4, including over the top of the optoelectronic component 2. The vertical alignment precursor layer 12' is thicker than that portion of the optoelectronic component 2 extending above the upper surface 4' of the substrate 4. For example, if the depth d of the recess 11, shown in FIG. 4B, is about 20 µm less than the thickness of the optoelectronic component 2, then the vertical alignment precursor layer 12' can be about 25 µm thick so as to cover the optoelectronic component 2. The vertical alignment precursor layer 12' can be made of, e.g., benzocyclobutane (BCB) (sold by DuPont). BCB is a thick polymer which can be coated on the substrate 4, e.g., by spinning. The BCB layer 12' can then be cured to a hard plastic consistency. Of course, any other material can be used, as long as it achieves the vertical alignment or planarizing function of the BCB layer 12', as will be evident from the following description.

The vertical alignment precursor layer 12' is then formed into a vertical alignment layer 12 and is provided with a thickness sufficient to allow the upper surface 2' of the optoelectronic component 2 to extend above the upper surface of the vertical alignment layer 12, as shown in FIGS. 3E and 4E. This can be accomplished by first flattening the upper surface of the vertical alignment precursor layer 12' after it is formed over the surface of the substrate 4. This can be accomplished by, e.g., two possible methods. A first way to flatten the vertical alignment precursor layer 12' is to cure the BCB layer 12', lap and polish the surface to achieve a flat surface. A second method is, after curing the BCB layer 12', to spin on a thick layer of photoresist, heat the photoresist (if necessary to make the photoresist flat), and then etch the photoresist and the BCB layer 12' with a Freon/oxygen reactive ion etch calibrated to give an identical etch rate for the BCB layer 12' and the photoresist.

After flattening the surface of the BCB layer 12', the BCB layer 12' is etched until a top surface 2' of the optoelectronic component is exposed, e.g., using reactive ion etching. This etch can be done with great precision by observing the color of the BCB layer 12' on the optoelectronic component 2 during the last 5,000 Å of etching. Interference effects cause specific thickness of the BCB layer 12' to appear as a specific color. A timed etch is then used to etch the BCB layer 12' to a precise distance below the upper surface 2' of the optoelectronic component 2. This is enabled by the fact that the timed etch is started from a known reference point, i.e., the top surface 2' of the optoelectronic 2 component. Since the thickness (height) of the optoelectronic component 2 will vary from bar to bar by as much as a half mil, and the etched depth of the recess will also vary by a half mil, the control of the BCB layer thickness after etching allows for these variations. The timed etch provides the vertical alignment layer 12, as shown in FIGS. 3E and 4E, which has a thickness to allow the upper surface 2' of the optoelectronic component 2 to extend above the upper surface of the vertical alignment layer 12 by a predetermined distance d' as shown in FIG. 4E.

By using the vertical alignment layer 12 made according to the method described and shown in the figures, the sol-gel waveguides 9a ... 9h can be fabricated on a foundation which is a precise distance d' below the top surface 2' of the optoelectronic component 2. This allows precise vertical alignment between the waveguides 9a ... 9h and the active devices of the optoelectronic component 2.

As shown in FIGS. 3F and 4F, a sol-gel cladding layer 13 is provided by, e.g., spinning and curing. In a sol-gel process, a liquid sol or colloidal suspension is coated over the vertical alignment 12 forming a wet gel. After further drying and heat treatment, the gel is cured into a dense material. The sol-gel cladding layer 13 can be made of, e.g., Methacryloxypropyltrimethoxysilane as the basic matrix with zirconium propoxide. Next, the sol-gel waveguide layer 14 is provided on the sol-gel cladding layer 13 in a similar manner. For example, a sol can be spun onto the sol-gel cladding layer 13, dried and heated to form a dense sol-gel waveguide layer 14. The sol-gel waveguide layer can be made of Methacryloxypropyltrimethoxysilane with a different proportion of zirconium propoxide.

Then, as shown in FIG. 3G, sol-gel ridge waveguides 9a, 9b . . . 9n are patterned, e.g., by etching. This is the lateral (horizontal) alignment of the waveguides with the optoelectronic component 2. Thus, known photolithography and etching, e.g., reactive ion etching, can be used to laterally align the waveguides 9a, 9b . . . 9n.

FIG. 4G is a sectional view along line 4G—4G, i.e., through waveguide 9b. FIG. 5 is a sectional view along line 5—5 of FIG. 3G between waveguides, in an area where there is no waveguide. FIG. 6 is a sectional view along lines 6—6 of FIG. 3G showing the sol-gel waveguides 9a–9b . . . 9n.

While a single optoelectronic component 2 is shown in this embodiment, a plurality of such optoelectronic components can be provided. Each optoelectronic component can have a single optoelectronic device or a plurality of such devices, e.g., an array of devices.

The method described herein has a number of advantages. First, a mentioned above, the top side up mounting of the optoelectronic component 2 facilitates access to tens of electrical drive contacts. Second, the alignment accuracy and simplicity is greatly enhanced since the sol-gel waveguides 9a, 9b . . . 9n are photolithographically aligned to the top side up mounted optoelectronic component 2. This provides significant advantages since alignment challenges are compounded when aligning arrays of waveguides. Thirdly, the sol-gel waveguide 9a, 9b . . . 9n can be photolithographically defined and fabricated after the optoelectronic component 2 is fabricated or mounted in or on the substrate 4, since low processing temperatures can be used for curing the sol-gel.

The ability to accommodate and process wider bandwidth signals cost effectively according to the present invention will greatly extend the tools available to scientists investigating earth environments as well as deep space objects and phenomena. The capability for cost effective scalability of current radiometer and interferometer instruments through large scale integration can also enable greater processing speed, resolution, range, and sensitivity of current and future spectroscopy instruments used for characterizing atmospheric and galactic systems. The presently disclosed technique for heterogeneous integration of III–V semiconductor and glass materials (the two primary material systems for nearly all currently developed active and passive integrated optics) will enable a huge potential for realization of true multi-functional photonic integrated circuits. This will have significant impact to a variety of applications in telecommunications and analog photonics.

Phased array antenna nuller processors have been proposed that utilize wideband photonically implemented correlation components. The present invention provides the ability to implement a highly compact processing unit and does much in minimizing size, weight, and DC power consumption for these units.

Next generation digital communications will be based on CDMA or some other multi-access protocol requiring signal correlation for optimal matched filter detection in the presence of other users and interference sources. The present invention provides the ability to implement such processing with ultra-high speed signals and allows for increased code word lengths and increased multi-user capacity directly impacting revenue generation. A highly compact correlation processor that can receive such wideband signals can only be facilitated with maximal levels of device integration.

A number of other application would become possible or easier with the heterogeneous integration capability described herein. For instance, WDM components could employ sol-gel waveguides as wavelength filters, with semiconductor components used for photodetectors and lasers.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. An integrated optoelectronic device, comprising:
   a substrate having an upper surface;
   at least one optoelectronic component affixed in a recess formed in the upper surface of the substrate such that the recess has a depth less than the thickness of the at least one optoelectronic component, which extends above the upper surface of the substrate;
   a vertical alignment layer formed on the substrate with a thickness sufficient to allow the at least one optoelectronic component to extend above the vertical alignment layer; and
   a sol-gel glass waveguide provided on the vertical alignment layer and optically connected to the at least one optoelectronic device, whereby the vertical alignment layer provides precise alignment of the sol-gel waveguide with the at least one optoelectronic device.

2. The integrated optoelectronic device according to claim 1, wherein the at least one optoelectronic component comprises a semiconductor chip.

3. The integrated optoelectronic device according to claim 2, wherein the semiconductor chip comprises a III–V semiconductor material.

4. The integrated optoelectronic device according to claim 1, wherein the at least one optoelectronic component comprises an array of semiconductor waveguide devices.

5. The integrated optoelectronic device according to claim 1, wherein the substrate is made of a material different from that of the sol-gel glass waveguide.

6. The integrated optoelectronic device according to claim 1, wherein the substrate is made of a material selected from the group consisting of Si, GaAs and InP.

7. A method for making an integrated optoelectronic device, comprising the steps of;
   providing a substrate;
   providing at least one optoelectronic component on the substrate; and
   providing at least one sol-gel glass waveguide on the substrate and optically connected to the at least one optoelectronic device;
   wherein the step of providing the at least one optoelectronic component on the substrate comprises etching a recess in the substrate to a depth less than the thickness of the at least one optoelectronic component, and affixing the at least one optoelectronic component in the recess so that an upper surface of the at least one optoelectronic component extends above an upper surface of the substrate;
   and wherein the method further comprises the step of forming a vertical alignment layer over the substrate with a thickness sufficient to allow the upper surface of the at least one optoelectronic component to extend above an upper surface of the vertical alignment layer.

8. The method for making the integrated optoelectronic device according to claim 7, wherein the substrate is made of a material different from that of the sol-gel glass waveguide.

9. The method for making the integrated optoelectronic device according to claim 7, wherein the substrate is made of a material selected from the group consisting of Si, GaAs and InP.

10. The method of making the integrated optoelectronic device according to claim 7, wherein the at least one optoelectronic component comprises a semiconductor chip.

11. The method of making the integrated optoelectronic device according to claim 10, wherein the semiconductor chip comprises a III–V semiconductor material.

12. A method for making an integrated optoelectronic device, comprising the steps of:

providing a substrate;

providing at least one optoelectronic component on the substrate; and providing at least one sol-gel glass waveguide on the substrate and optically connected to the at least one optoelectronic device; and forming a vertical alignment layer over the substrate with a thickness sufficient to allow the upper surface of the at least one optoelectronic component to extend above an upper surface of the vertical alignment layer, said step of providing the vertical alignment layer with the thickness sufficient to allow the upper surface of the at least one optoelectronic component to extend above the upper surface of the vertical alignment layer comprising the steps of:

flattening the upper surface of the vertical alignment layer after it is formed over the substrate;

etching the vertical alignment layer over the substrate until the upper surface of the optoelectronic component is exposed; and performing a timed etch to provide the vertical alignment layer with the thickness sufficient to allow the upper surface of the at least one optoelectronic component to extend above the upper surface of the vertical alignment layer.

13. A method for making an integrated optoelectronic device, comprising the steps of:

providing a substrate;

providing at least one optoelectronic component on the substrate; and providing at least one sol-gel glass waveguide on the substrate and optically connected to the at least one optoelectronic device; and forming a vertical alignment layer over the substrate with a thickness sufficient to allow the upper surface of the at least one optoelectronic component to extend above an upper surface of the vertical alignment layer, said step of providing the at least one waveguide on the substrate comprising coating a sol over the upper surface of the vertical alignment layer, curing the sol to provide a sol-gel glass layer, and patterning the sol-gel to provide the at least one waveguide.

14. The method for making an integrated optoelectronic device according to claim 13, further comprising providing a sol-gel cladding layer on the vertical alignment layer before providing the at least one waveguide, and wherein the step of providing the at least one waveguide comprises providing the at least one waveguide on the sol-gel cladding layer.

* * * * *